Oct. 28, 1952         H. J. STEGEMAN         2,615,293
              SWAY CONTROL MEANS FOR LAWN MOWERS
Filed Jan. 29, 1951                         2 SHEETS—SHEET 1
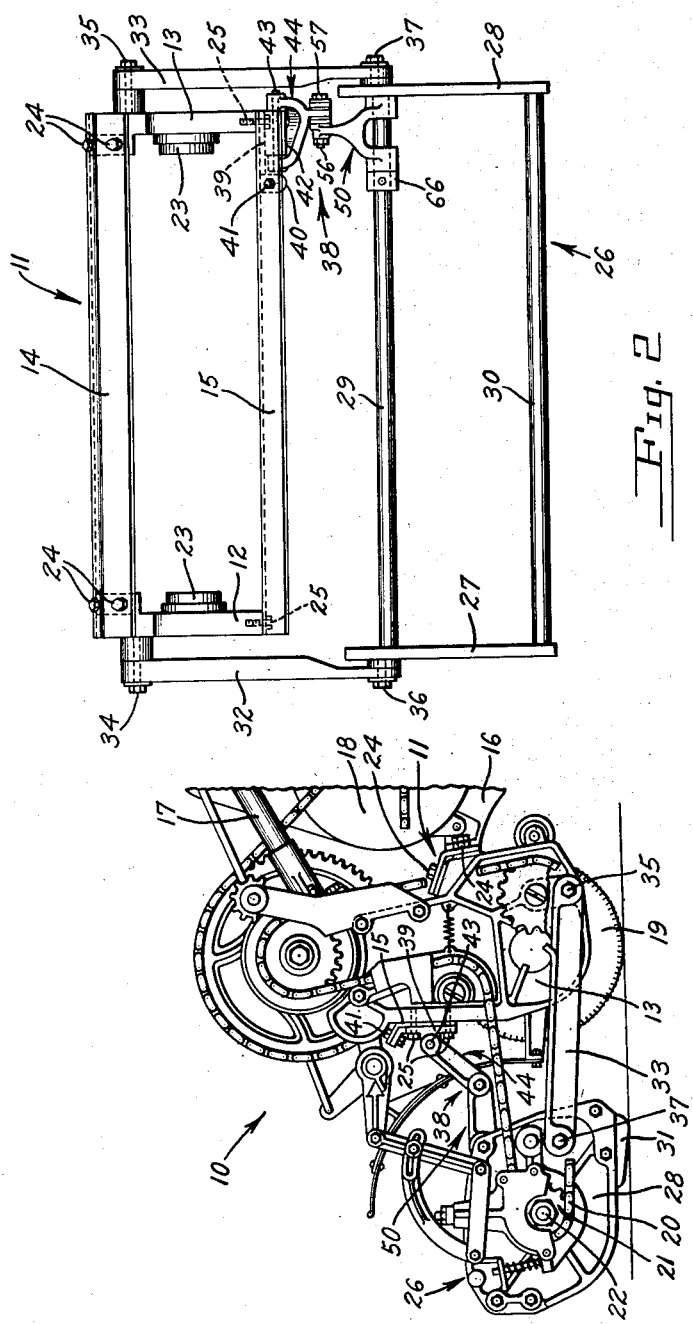
INVENTOR.
HENRY J. STEGEMAN
BY
ATTORNEY Oct. 28, 1952     H. J. STEGEMAN     2,615,293
SWAY CONTROL MEANS FOR LAWN MOWERS
Filed Jan. 29, 1951     2 SHEETS—SHEET 2
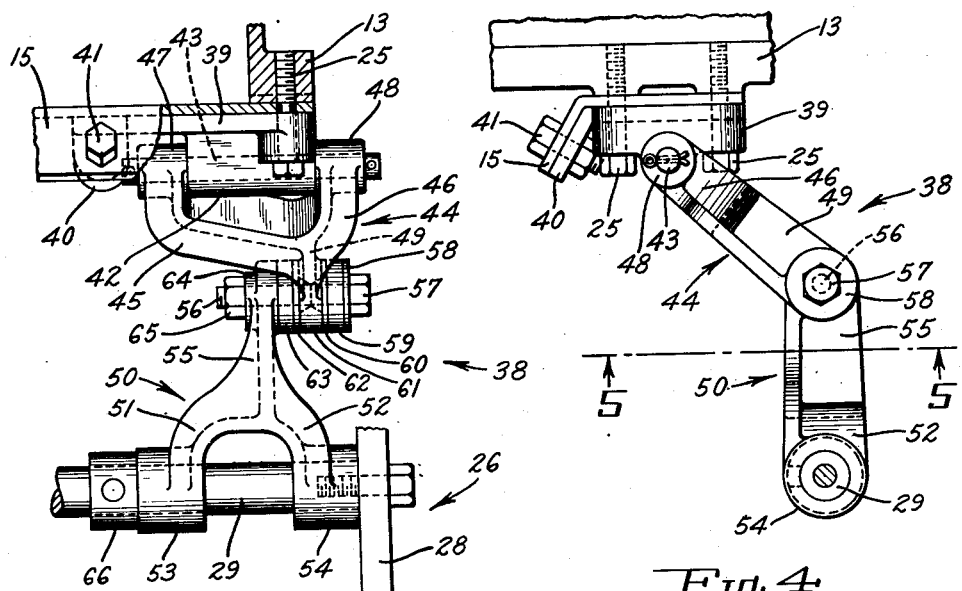
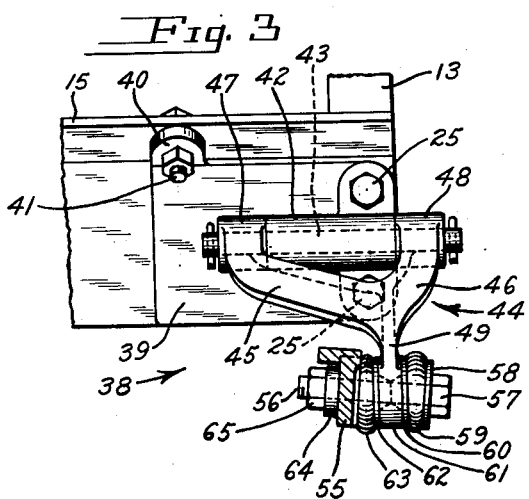
INVENTOR.
HENRY J. STEGEMAN
BY
ATTORNEY Patented Oct. 28, 1952

2,615,293

UNITED STATES PATENT OFFICE 2,615,293

SWAY CONTROL MEANS FOR LAWN MOWERS

Henry J. Stegeman, Fairfield, Conn., assignor to The Locke Steel Chain Company, Bridgeport, Conn., a corporation of Connecticut Application January 29, 1951, Serial No. 208,387

2 Claims. (Cl. 56—26)

This invention relates to new and useful improvements in power lawn mowers and has particular relation to a means for preventing substantial side sway of a cutter frame with respect to the main frame of a lawn mower and which means resiliently resists side sway of the cutter frame relative to the main frame of a lawn mower.

An object of the invention is to provide in a power lawn mower a means for the purpose stated and which means is of simple and inexpensive construction, fully effective for the purpose intended, and which may be applied to or built into a mower at a minimum of expense.

Another object is to provide a sway control means which while of general application is especially useful in a power lawn mower including a main frame, a cutter frame, and distance links pivotally connecting and spacing said frames.

Other objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 1 is a side elevational view showing a portion of a lawn mower constructed in accordance with the invention;

Fig. 2 is a top plan view of the frames and spacing members of the lawn mower connected by the side sway control means of the invention;

Fig. 3 is an enlarged top plan view of the side sway control means showing associated with it only adjacent mounting parts of the main frame and the cutter frame;

Fig. 4 is a side elevational view taken as looking from the right in Fig. 3; and Fig. 5 is a view partly in section showing the means as when one end only of the cutter frame is raised, the view being as along the plane of the line 5—5 of Fig. 4.

Referring in detail to the drawings, at 10 is generally indicated the forward portion of a power lawn mower, as for example that lawn mower more fully disclosed in Patent 1,886,408 of November 18, 1932, to Locke and Stegeman. Such mower incudes a main frame, generally designated 11, and comprising a pair of end members 12 and 13 in the form of castings, rear and forward cross members 14 and 15 in the form of transversely generally L-shaped bars, and other elements 16 and 17, as well as parts not immediately concerned with the present invention but disclosed in the above identified patent. A motor 18, supported on the main frame, through suitable chains and sprockets, is adapted to be coupled to drive ground engaging main frame supporting rolls 19 and through a chain 20 and a sprocket 21, a cutter reel (not shown) mounted on the shaft 22.

Main frame end members or castings 12 and 13 carry portions 23 for the reception of bearings for the mounting of the shaft or shafts of the ground engaging roll 19. Bolts 24 secure the end portions of the main frame cross member 14 to the end members 12 and 13 of the main frame and somewhat similarly bolts 25 secure the end portions of main frame cross member 15 to the forward sides of the said end members or castings.

The shaft 22 carrying the cutter reel or rotary cutter (not shown) is mounted in a cutter frame generally designated 26 and comprising a pair of end members 27 and 28 which are generally castings, and a pair of cross bars 29 and 30 fast to the rear and forward portions of said end members 27 and 28. The mentioned rotary cutter will cooperate with a stationary blade (not shown) at the underside of which is located the ground engaging member 31, the purpose of which is fully set forth in the above mentioned patent.

Connecting the main frame 11 and the cutter frame 26 are a pair of rigid spacing members or links 32 and 33. As shown, the members 32 and 33 are each in the form of a relatively heavy bar and they are located at the outer sides of the end members of the frames 11 and 26. The spacing links or members 32 and 33 are pivoted at their rear ends to the end frame members 12 and 13 as at 34 and 35 and at their forward ends to the end members 27 and 28 of the cutter frame 26 as at 36 and 37.

The spacing links 32 and 33 insure of movement of the cutter frame 26 with the main frame 11 as the machine is propelled along on the roll 19. They also provide for elevation of the cutter frame during transportation of the machine, as to and from a lawn, and for up and down movements of the cutter frame relative to the main frame as the machine is propelled over a lawn having inclines and declines therein. It will be understood that the pivot pins at 34 and 35, and 36 and 37 have a certain amount of play in the pivot holes in the ends of the links 32 and 33, which not only allows one end of the cutter frame 26 and the cutter reel carried thereby to drop or raise with respect to the other end as rises and falls are encountered in the lawn, but also permits a substantial amount of side sway of the cutter frame relatively to the main frame, especially as the mower is turned.

The structure as thus far described is the same or substantially the same as that disclosed in the Locke and Stegeman patent above identified.

The present invention relates to a side sway control means for preventing substantial side sway or endwise movement of the cutter frame 26 relative to the main frame 11 and for resiliently resisting any such side sway. The side sway control means of the invention is generally designated 38 and as clearly shown in Figs. 1 and 2 connects the frames 11 and 26 and is located between or in a plane between the planes occupied by the spacing members or links 32 and 33. Means 38 includes a mounting bracket 39 having a flat plate-like portion disposed against the vertical arm of the cross member 15 of the main frame and secured thereagainst by two of the end bolts 25 above mentioned.

Extending forwardly and upwardly at an incline from said plate-like portion, the bracket 39 includes an ear 40 located against the underside of the forwardly inclined portion of the frame member 15 and tightly secured thereto and thereagainst by nut and bolt means 41. This bracket also includes a forwardly projecting elongated ear 42 comprising a bearing means through which extends a short shaft or pivot 43.

In addition to mounting bracket 39, the sway control means of the invention includes a member generally designated 44 of substantially Y-shape and comprising a pair of arms 45 and 46 having eyes or bearing portions 47 and 48 at their respective rearward ends and at their forward ends merging with the third arm 49 of the Y formation.

Then the sway control means 38 includes a second member 50 also generally in the form of a Y and comprising arms 51 and 52 at their forward ends provided with eye formations or bearing portions 53 and 54. The third arm 55 of the Y-shaped member 50 has its rear end lying adjacent the forward end of the arm 49 of member 44 and a pivot means 56 passes through aligned openings in said adjacent portions or parts of said arms 55 and 49.

As here disclosed, the pivot means 56 is in the form of a bolt having a head 57. The shank of the bolt passes through a metal washer 58, a thick annulus 59 of rubber or other compressible material, then through another metal washer 60, through the eye 61, which is larger than the diameter of the shaft and cone-shaped from each side or end, at the end of the arm 49, through a second washer 62 and a second relatively thick rubber or other compressible annulus 63 and then through the eye 64 on the end of arm 55. At the outer side of eye 64, a nut 65 is threaded into the bolt or pivot.

The bearing portions 47 and 48 of member 44 are spaced apart to neatly receive between them the bearing 42 of bracket 39 and the pivot or shaft 43 passes through said eyes 47 and 48 whereby the member 44 is pivotally mounted on the bracket 39. Since the latter is rigidly attached to the main frame 11, said member 44 is pivotally attached to said main frame for pivotal movement about the horizontally arranged pivot or shaft 43.

The bearing portions 53 and 54 of member 50 of my sway control means receive the bar 29 of the cutter frame whereby said member 50 is mounted for pivotal movement on said bar or for pivotal movement about a horizontal axis, since said bar is horizontally arranged. Member 50 is located longitudinally of the bar 29 since the outer end of its bearing 54 is against the inner side of the end member 28 of the cutter frame and then a collar 66 is fixed to the rod 29 in a position to be engaged by or substantially engaged by the eye 53 of member 50.

The sway control means 38, being located as described and attached to the main frame 11 and the cutter frame in such a manner as to be only capable of limited pivotal movement about the axes represented by pivot or shaft 43 and bar 29, is positioned to prevent any substantial side sway of the cutter frame relative to the main frame. This is true since the adjacent end portions of the members 44 and 50 are pivotally connected by the bolt 56 on an axis parallel with the axes about which the outer ends of the members 44 and 50 may pivot.

This intermediate pivot provides for "floating" of the cutter frame up and down with respect to the main frame and for the elevation of the cutter frame to an inoperative position when the mower is being taken to a place of use or returned from a place of use, as when it may be moved over driveways and the like.

The present device 38 is not so rigid as to absolutely prevent any side sway of the cutter frame relative to the main frame. The spacing links 32 and 33 insure a parallel relation of the bars 15 and 29 at all times, when viewed in plan. However, on raising of one end of the cutter frame 26 while the other end remains on the ground, there is a tendency toward side sway of the cutter frame relative to the main frame and such tendency is resisted by means 38. Figure 5 illustrates the action which takes place in the pivotal connection between the adjacent ends of the members 44 and 50 on raising of one end only of the cutter frame, such figure illustrates conditions existing when the left hand end of the cutter frame 26 is raised while the right hand end remains on the ground.

Thus, in Fig. 5, the members 44 and 50 being rigid and incapable of lateral pivoting with respect to the main and cutter frames, as the left hand end portion of the cutter frame has been lifted, the member 50 is tilted as substantially along the axis of its arm 55 tending to rock the eye 64 of its said arm 55 whereby said eye presses against the lower portion of the nut 65. The opening through the eye of the arm 49 is slightly larger than the diameter of the bolt or pivot 56 and is cone-shaped from each end.

The mentioned rocking therefore results in slight shifting of the bolt or pivot 56 whereby the latter is misaligned or pressed out of normal position and the third compressible washers 59 and 63 compensate for such misalignment. Thus, with the parts as in Fig. 5, the lower portion of the relatively thick rubber or other compressible washer 59 is compressed while its upper portion is somewhat released and tends to expand. The reverse action takes place with respect to the relatively thick washer 63 located at the opposite side of the eye 61. That is, the lower portion of said washer is slightly released and tends to expand while its upper portion is compressed.

Having thus set forth the nature of my invention, what I claim is:

1. In a lawn mower having a main frame, a cutter frame, and pivoted spacing links for holding the cutter frame in spaced relation with the main frame, and whereby said cutter frame has relative movement to said main frame, the improvement which comprises a pair of rigid arm members having pivot connection means at their outer ends for pivotal connection to said main and cutter frames respectively, an intermediate pivot connection means connecting the inner ends of said arm members together whereby said arms have pivotal movement about their pivot connections with said main and cutter frames upon said relative movement of the latter, said intermediate pivot connection means comprising a pivot member having a normally horizontal pivot axis and loosely engaged with at least one of said arm members to allow relative tilting movement of said normally horizontal axis and relative movement between said pivot member and arm member in the direction of the length of said axis, and resilient means interposed between said arm members and said pivot member and resiliently constraining said pivot member to its normal horizontal pivot axis position.

2. In a lawn mower having a main frame, a cutter frame, and pivoted spacing links for holding the cutter frame in spaced relation with the main frame, and whereby said cutter frame has relative movement to said main frame, the improvement which comprises a pair of rigid arm members having pivot connection means at their outer ends for pivotal connection to said main and cutter frames respectively, an intermediate pivot connection means connecting the inner ends of said arm members together whereby said arms have pivotal movement about their pivot connections with said main and cutter frames upon said relative movement of the latter, said intermediate pivot connection means comprising a pivot bolt member having a normally horizontal pivot axis, one of said arm members having a bolt hole of larger diameter than said bolt in which said bolt is loosely engaged to allow relative tilting movement of said normally horizontal axis and relative movement between said pivot member and arm member in the direction of the length of said axis, and the other of said arms having a bolt hole engaged by said bolt in axially spaced relation to said one arm member, and a pair of resilient means on said bolt, one interposed between the inner sides of said arm members and the other at the outer side of said arm member, and resiliently constraining said pivot bolt member to its normal horizontal pivot axis position.

HENRY J. STEGEMAN.

REFERENCES CITED

The following references are of record in the file of this patent:

UNITED STATES PATENTS

| Number | Name | Date |
|---|---|---|
| 2,313,590 | Sherer, Jr. et al. | Mar. 9, 1943 |
| 2,505,879 | Blydenburgh | May 2, 1950 |